United States Patent [19]
Melville et al.

[11] Patent Number: 4,793,025
[45] Date of Patent: Dec. 27, 1988

[54] APPARATUS AND METHODS FOR REMOVAL OF TISSUE FROM BONE

[76] Inventors: Richard A. Melville; Douglas W. Melville, both of 8c Tagalad Road, Auckland, New Zealand

[21] Appl. No.: 70,402

[22] Filed: Jul. 7, 1987

[30] Foreign Application Priority Data

Jul. 7, 1986 [NZ] New Zealand .................. 216766

[51] Int. Cl.⁴ .............................................. A22C 17/04
[52] U.S. Cl. ........................................ 17/46; 17/1 G; 83/177
[58] Field of Search ............... 17/1 R, 51, 52, 16, 17/46; 83/177, 435.2

[56] References Cited

U.S. PATENT DOCUMENTS

| | | | |
|---|---|---|---|
| 2,851,362 | 8/1958 | Goldberg | 17/46 X |
| 3,505,963 | 4/1970 | Westling | 83/177 X |
| 3,722,032 | 3/1973 | Draper et al. | 17/46 X |
| 4,402,112 | 9/1983 | Gasbarro | 17/46 X |
| 4,534,085 | 8/1985 | Stewart | 17/46 |

*Primary Examiner*—Willie G. Abercrombie
*Attorney, Agent, or Firm*—Pearne, Gordon, McCoy & Granger

[57] ABSTRACT

An apparatus for processing either a fresh or frozen piece of meat, in particular for frenching a rack of lamb. A pair of chain conveyers each incorporating teeth are mounted in adjacent spaced apart relationship on a bench. A piece of meat is transported along by and between the conveyer chains with the teeth thereof gripping the meat. The piece of meat is orientated on the conveyer to dispose a required section thereof to a cutting zone. At a first cutting station liquid jet cutting means are located to either side of the path of the meat to direct a liquid jet onto the predetermined section and cut thereinto. At a second cutting station a liquid jet stripping means is provided to remove the previously cut meat.

6 Claims, 3 Drawing Sheets

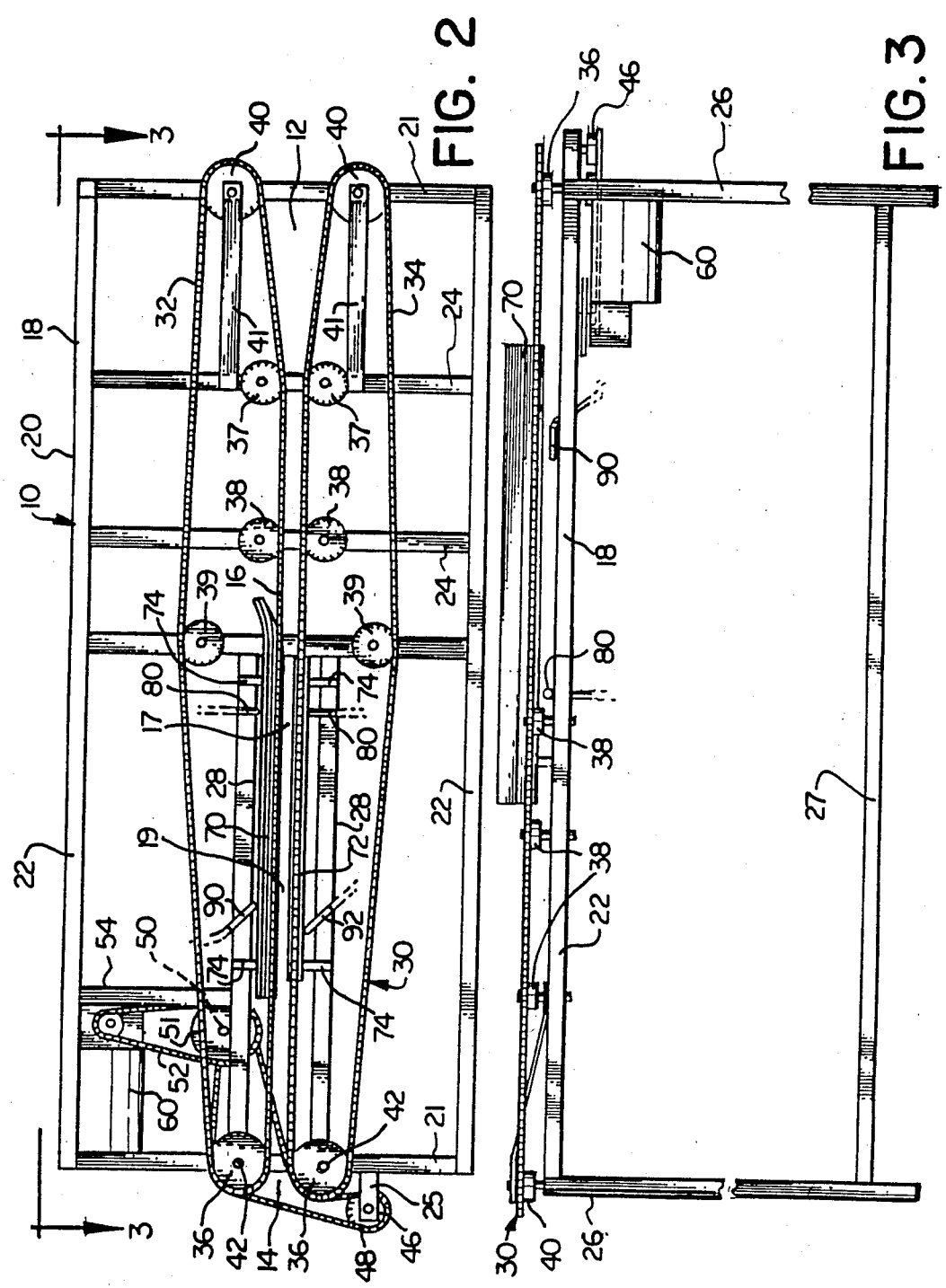

APPARATUS AND METHODS FOR REMOVAL OF TISSUE FROM BONE

This invention relates generally to a method and an apparatus for the preparation of a piece of meat for consumption, and more particularly, to the removal of predetermined portions of the tissue from the bone of a piece of meat.

Among sophisticated diners, rack of lamb has become increasingly sought after in recent times. The "rack" is a cut of meat including the ribs. The rack may be prepared and sold at retail or served in a restaurant as a rib roast containing several ribs, or as rib chops, each chop containing a single rib. Rib roast may be further prepared by slitting a roast to partially sever individual rib chops, and subsequently forming the roast into a generally cylindrical shape with the fell of the roast on the interior, thus forming a crown roast.

It is a common practice in preparing rack of lamb to remove a portion of the tissue from the individual ribs around the rib tips at the narrow end of the roast or chop. This process, usually referred to as "frenching," has been accomplished manually in the past by a skilled butcher utilizing a knife. The exposed rib tips are frequently decorated with garnish when the rack is served as a crown roast.

The prior art process of frenching a lamb rack is labor intensive in that all the tissue surrounding a predetermined portion of the ribs, usually the tissue within an inch or so of the rib tip, must be carefully removed, a process which requires multiple cuts with a knife. When cut by hand the meat must be fresh, or if previously frozen for storage, must first be thawed out.

Further, the frenching process is not easily automated by routine prior art meat preparation techniques. For example, the tissue could not be easily removed from the rib ends with a power saw. While a power saw such as a butcher's band saw could conceivably be used to make parallel cuts on either side of the ribs dividing the portion of the tissue to be removed from that which is to be retained on the roast, the tissue between the ribs still must be severed by hand and the tissue to be removed must also be somehow stripped from the bones. This process would require multiple complex manipulations of the piece of meat.

The present invention provides a method and an apparatus for quickly and efficiently frenching racks of lamb and removing tissue from other types of meat. The method and apparatus of the present invention do not require the services of a skilled butcher and the associated expense, and provide other advantages as will hereinafter become apparent.

The apparatus of the present invention can be used for the automated processing of a piece of meat such as a lamb rack to remove tissue from bone. The apparatus includes conveyer means for transporting the piece of meat including a meat input end and a meat output end. The apparatus also includes fluid delivery means positioned between the input and output ends for dispensing fluid at a predetermined pressure for contacting a predetermined portion of the piece of meat to remove a corresponding predetermined portion of the tissue from the bone.

Preferably, the fluid delivery means includes liquid jet means for cutting the tissue of the piece of meat and liquid jet means for stripping tissue from the piece of meat. The conveyer means is preferably adapted to move the piece of meat through a first position proximate the cutting means. The cutting means cuts at least a portion of the tissue of the piece of meat when the piece of meat is moved through the first position. The conveyer means is also preferably adapted to move the piece of meat through a second position proximate the stripping means. The stripping means strips at least a portion of the tissue from the piece of meat when the piece of meat is moved through the second position.

A rack of lamb can be processed by the apparatus of the present invention. Further, a frozen piece of meat can be processed using the apparatus.

The foregoing summary, as well as the following detailed description of the presently preferred embodiment of the invention, will be better understood when read in conjunction with the appended drawings, it being understood, however, that this invention is not limited to the precise arrangements illustrated. In the drawings:

FIG. 2 is a top plan view of the apparatus of FIG. 1;

FIG. 3 is a broken side elevational view taken along the line 3—3 of FIG. 2;

Figure 1:
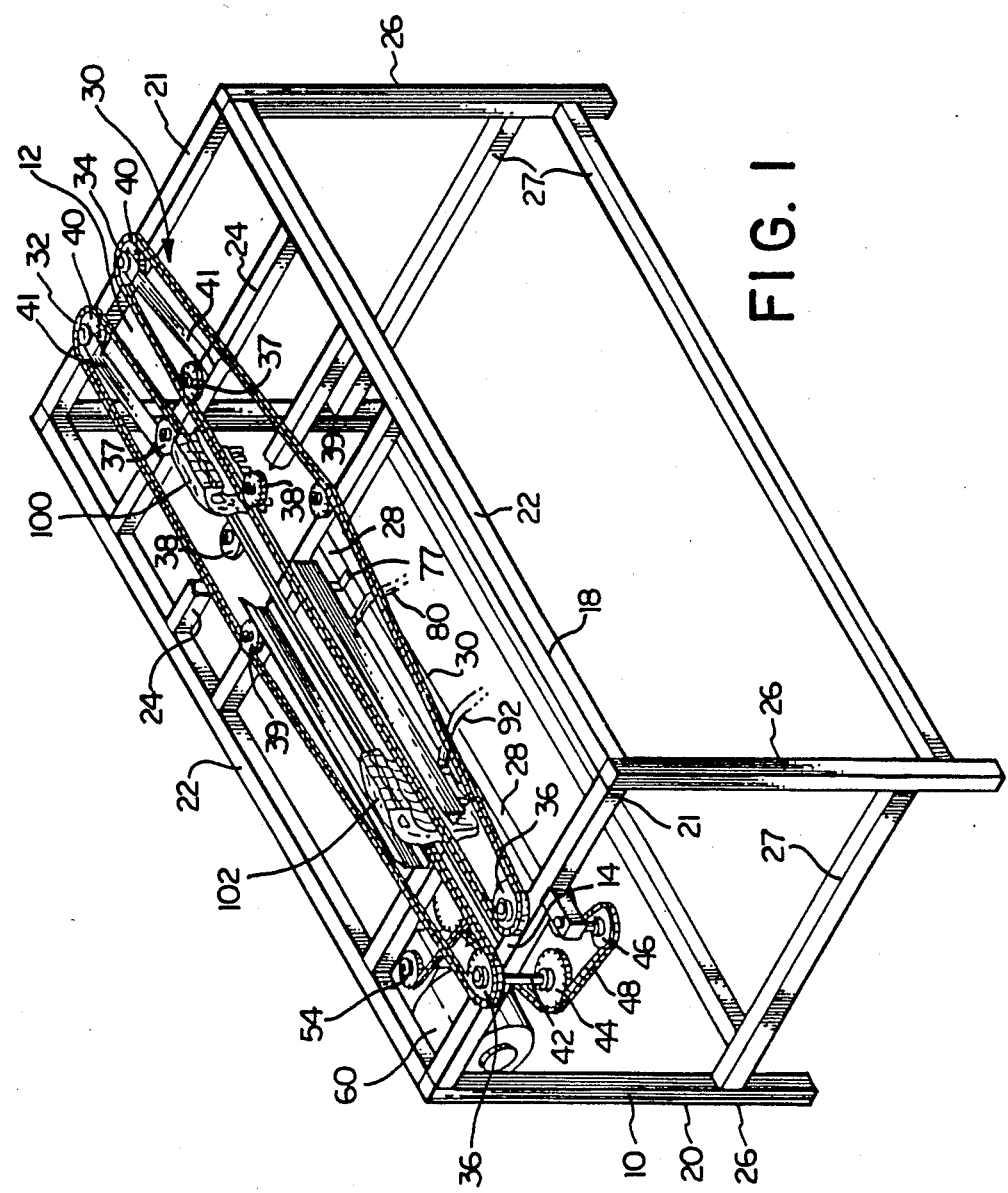
FIG. 1 is a partially broken perspective view of a frenching apparatus in accordance with a preferred embodiment of the present invention with a cross member partially removed for clarity.

Referring to the drawings wherein like numerals indicate like elements throughout the several views and particularly to FIG. 1, it can be seen that the present invention in one presently preferred embodiment provides a frenching apparatus 10 including a base member or base 20, a conveyer means or conveyer 30 having an input end 12 and an output end 14 and adapted to transport pieces of meat such as racks of lamb 100, 102, and fluid delivery means in the present embodiment in the form of a plurality of liquid jet means 80, 90, 92. The fluid delivery means 80, 90, 92 dispenses fluid at a predetermined pressure for contacting a predetermined portion of the piece of meat to remove a corresponding predetermined portion of the tissue from the bone. As used in the present specification, the term "tissue" denotes any and all types of tissue present in an animal carcass excluding bone.

The base 20 of the frenching apparatus 10 is constructed from a plurality of generally straight elongated frame members formed from tube or bar stock. Preferably, the base 20, as well as the conveyer 30 and fluid delivery means 80, 90, 92, are constructed from a high-strength easy-to-clean material such as stainless steel or the like. The base 20 includes a generally planar, generally horizontal top frame 18 formed from a pair of parallel side members 22, a pair of parallel end members 21, and cross members 24, and extending generally parallel to the end members 21. The top frame 18 further includes a pair of generally parallel center members 28 extending between one of the end members 21 and one of the cross members 24 for a purpose to be described below. The various components of the top frame 18 are rigidly secured together as shown by any suitable means such as by welding or nuts and bolts (not shown). The top frame 18 has a generally rectangular shape (in plan view) and is supported at its corners by a plurality of generally vertically extending legs 26. Strength and rigidity are added to the base 20 by a plurality of support members 27 extending between the legs 26 at their lower ends.

The end members 21 and cross members 24 of the top frame 18 support a plurality of generally vertical shafts on which a plurality of gears or sprockets employed in the conveyor 30 are rotatably mounted by conventional bearing means. Alternatively, the sprockets can be rigidly affixed to the shafts and the shafts in turn rotatably mounted to the top frame 18 by conventional bearing means.

The conveyor 30 includes a continuous or endless first drive chain 32 and a continuous or endless second drive chain 34 which cooperate to transport the rack of lamb 100 through the frenching apparatus 10 as described below. As best seen in the enlarged perspective views of FIGS. 4 and 5, at least some of the individual links 62 of the second drive chain 34 and the first drive chain 32 (not illustrated) include outwardly extending (with respect to the interior of the endless drive chain 34) teeth 64 which are adapted to engage the piece of meat 100. As best seen in FIG. 2, the links 62 of the drive chains 32, 34 are engaged by the plurality of sprockets. The sprockets are positioned above the top frame 18 (FIG. 3) and serve to define the shapes of the drive chains 32, 34 when the drive chains 32, 34 are mounted thereon.

The first and second drive chains 32, 34 are driven by driving sprockets 36 positioned proximate the output end 14 of the frenching apparatus 10. The drive chains 32, 34 are driven as described below so that the first drive chain 32 rotates counterclockwise and the second drive chain 34 rotates clockwise when the frenching apparatus is viewed as in FIG. 2. The first drive chain 32 and second drive chain 34 are preferably driven at substantially the same rate of speed. Driving the drive chains 32, 34 at different rates of speed is generally undesirable, as this will cause the piece of meat to rotate as it is transported through the frenching apparatus 10. However, in certain cases rotation of the pieces of meat may be desired.

Proximate the input end 12 of the frenching apparatus 10 the drive chains 32, 34 are supported by a pair of input sprockets 40 which are rotatably affixed to vertical shafts extending from an end member 21. Support members 41 extend between the top surface of a cross member 24 parallel to the side members 22 to positions above the input sprockets 40. The support members 41 aid in supporting the shafts on which the input sprockets 40 are mounted against deflection caused by tension on the drive chains 32, 34.

In operation, individual links 62 of the drive chains 32, 34 travel in a generally horizontal plane from the input sprockets 40 toward the output end 14 of the frenching apparatus 10. At the input end 12 the chains 32, 34 are spaced apart a distance which is greater than in the remainder of the apparatus 10 so that the individual links 62 of each drive chain 32, 34 also travel generally toward the links 62 of the other drive chain. A pair of first idler sprockets 37 are mounted on a cross member 24. As best seen in FIG. 2, the diameter and spacing of the first idler sprockets 37 and the input sprockets 40 are selected so that the links 62 of the first and second drive chains 32, 34 converge as the drive chains 32, 34 travel between the input sprockets 40 and the first idler sprockets gears 37.

In operation, an operator manually places a piece of meat 100 between the drive chains 32, 34 at some point between the input sprockets 40 and the first idler sprockets 37 so that the piece of meat is contacted or engaged and gripped by the teeth 64 on the converging drive chains 32, 34. The position at which the piece of meat is first contacted by the chain teeth 64 depends on its size and orientation. However, because the drive chains 32, 34 gently converge between the input sprockets 40 and the first idler sprockets 37, substantial individual variation in the size and orientation of the pieces of meat can be accommodated by the frenching apparatus 10. If desired, the operation of supplying pieces of meat 100 to the input end 12 of the frenching apparatus 10 can be automated (not shown).

Figure 4:
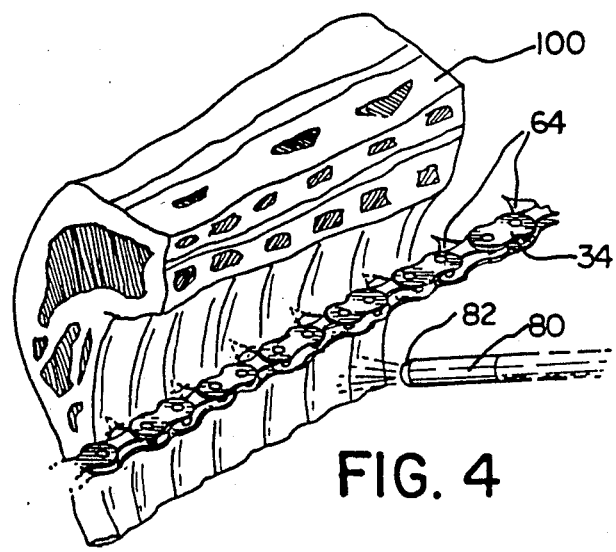
FIG. 4 is an enlarged partial perspective view of a portion of the apparatus of FIG. 1 with a guard removed and showing the operation of a cutting jet.
Figure 5:
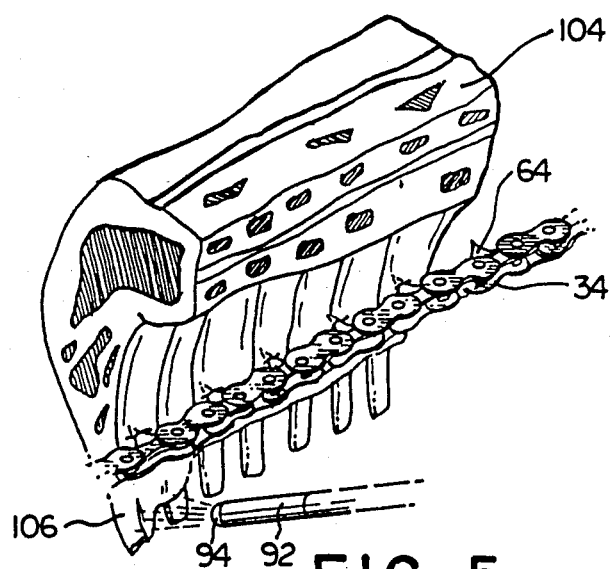
FIG. 5 is an enlarged partial perspective view of a portion of the apparatus of FIG. 1 with a guard removed and showing the operation of a stripping jet.

As best seen in FIGS. 4 and 5, when the piece of meat 100 is a rack of lamb or similar cut of meat, the piece of meat 100 is preferably oriented so that the ribs are generally perpendicular to the plane defined by the drive chains 32, 34, and so that the rib tips 106 extend below the plane defined by the drive chains 32, 34. As discussed further below, the piece of meat 100 is preferably oriented between the drive chains 32, 34 so that the portion of the piece of meat 100 which is to have tissue removed by the frenching apparatus 10 is positioned below the plane defined by the drive chains 32, 34.

From the first idler sprockets 37 the drive chains 32, 34 move in generally parallel spaced relation through a pair of second idler sprockets 38 and ultimately to a pair of driving sprockets 36 positioned proximate the output end 14 of the frenching apparatus 10. Between the second idler sprockets 38 and the driving sprockets 36, the drive chains 32, 34 tightly hold and transport the piece of meat 100 through a working section 16 of the frenching apparatus 10 in which tissue is cut and stripped from the piece of meat 100.

From the driving sprockets 36 the individual links 62 of the drive chains 32, 34 return to the input section 12 of the frenching apparatus 10 after first passing over a pair of return idler sprockets 39 positioned on a cross member 24 located approximately halfway between the end members 21 (FIG. 2). Conventional means can be provided for adjusting the tension in the drive chains 32, 34.

The driving sprockets 36 are securely affixed to shafts 42 extending vertically and rotatably through an end member 21. A pair of driven transmission sprockets 44 are affixed to each of the shafts 42 below the end member 21. The driven transmission sprockets 44, as well as a driving transmission sprocket 50, and a transmission idler sprocket 46, are engaged by a single endless transmission chain 48. The transmission chain 48 is adapted to transfer the rotational motion of the driving transmission sprocket 50 to the driven transmission sprockets 44. Thus each pair of driven transmission sprocket 44 and driving sprocket 36 affixed to a common shaft 42 rotate in opposite directions at the same angular speed. The driving, idler, and driven transmission sprockets 50, 46, 44 are preferably located in the same plane and positioned below the plane of the top frame 18 as best seen in FIG. 1. The transmission idler sprocket 46 is rotatably affixed to a generally vertical shaft extending downwardly from an extension member 25 affixed to the end member 21 on which the driven transmission sprockets 44 are mounted.

The driving transmission sprocket 50 is affixed to a shaft which also has a drive power sprocket 51 affixed thereto. The driven power sprocket 51 and a driving power sprocket 54 are generally coplanar and are engaged by an endless power chain 52 extending therebetween. The power sprocket 54 is affixed to the output shaft of a prime mover or motor 60 for providing rotational motion to the conveyer 30. In the present embodiment, the motor 60 is an electric motor such as a 0.18 kilowatt electric motor of conventional design. The speed at which the motor 60 is operated, as well as the relative sizes of the power sprockets 51, 54 and the transmission sprockets 44, 46, 50 are selected to provide the desired speed of operation of the conveyer 30. Alternatively, some other form of transmission means (not shown) may be provided to drive the drive chain 32, 34 as described above.

Proximate the working section 16 a pair of generally parallel center members 28 are spaced from one another and extend generally parallel to side members 22 between an interior cross member 24 and an end member 21 supporting the driving sprockets 36. Supported by the center members 28 are a plurality of jet means 80, 90, 92 which are employed for cutting and stripping tissue from the piece of meat 100 as described below. In addition, first and second elongated deflector members or guards 70, 72 are mounted on a portion of the center members 28 by a plurality of mounting brackets 74. The guards 70, 72 are generally L-shaped in cross section and are mounted generally parallel to the drive chains 32, 34 and spaced therefrom. The guards 70, 72 are shaped and positioned to protect a portion of the piece of meat 100 from liquid sprayed from the jet means 80, 90, 92.

Proximate a first predetermined position 17 a pair of cutting jet means 80, best seen in FIG. 2, direct a pair of colinear, generally oppositely directed fine jets of fluid, preferably liquid, at a predetermined position on the piece of meat 100 as it passes through the first position 17. When the piece of meat 100 is rack of lamb, it is preferred that the jets be directed to contact the piece of meat 100 about one to one and one-half inch from the tips of the ribs. As best seen in FIG. 4, each cutting jet means 80 is provided with a nozzle 82 which is adapted to form a fine jet of liquid having a generally circular cross section. The jets of fluid provided by the cutting jet means 80 function to cut into the tissue of the piece of meat 100 scribing generally parallel fine lines on either side of the piece of meat 100 as the piece of meat 100 is being transported through the first position 17.

As best seen in FIG. 2, the conveyer 30 of the frenching apparatus 10 is adapted to transport the piece of meat 100 generally linearly, the motion of the piece of meat 100 thus defining a line. Preferably, the cutting jet means 80 are positioned to deliver jets of fluid generally perpendicular to the path defined by the motion of the piece of meat 100. As best seen in FIG. 3, the cutting jet means 80 are positioned below the plane defined by the drive chains 32, 34 so that the fluid contacts only the portion of the tissue to be removed.

After leaving the first predefined position 17 the piece of meat 100 is transported by the conveyer 30 through a second predetermined position 19. A second piece of meat 102 is shown in FIG. 1 being transported through the second predetermined position 19. As the piece of meat 100 approaches the second predetermined position 19 a first stripping jet means 90 provided with a nozzle for forming a generally fan-shaped jet of liquid directs the fan-shaped jet of liquid at the piece of meat 100. Subsequently, as the piece of meat 100 moves away from the second predefined position 19, a second stripping jet means 92 fitted with a nozzle for forming a generally fan-shaped jet of liquid 94 (FIG. 5) directs another jet of liquid at the piece of meat 100. In the present embodiment, preferably, the first stripping jet means 90 is adapted to deliver a jet of liquid directed at an angle of about 38 degrees with respect to the path along which the piece of meat 100 is transported. In the present embodiment, it is also preferred that the second stripping jet means 92 be adapted to deliver a jet of liquid directed at an angle at about 48 degrees with respect to the path along which the piece of meat 100 is transported.

The first and second stripping jet means 90, 92 function to blast or strip at least a portion of the tissue from the piece of meat 100 as the piece of meat 100 is moved through the second position 19. Thus, when the piece of meat 100 is a rack of lamb having the rib tips 106 oriented to extend below the drive chains 32, 34, the cutting jet means 80 and stripping jet means 90, 92 remove tissue proximate the rib tips 106 (FIG. 5) thus frenching the rack of lamb 104.

A tray or container (not shown) can be provided proximate the output end 14 of or under the frenching apparatus 10 to receive tissue stripped from the piece of meat 100 by the stripping jet means 90, 92.

Preferably, the liquid delivered by the jet means 80, 90, 92 is water, although other cutting fluids can be employed. In the present embodiment the fluid is dispensed at a predetermined pressure, preferably at a pressure of about 5,000 psi. The pressurized fluid is provided by conventional fluid pumping means (not shown) which is connected to the jet means 80, 90, 92 by suitable fluid conduit means such as metal tubing (not illustrated).

While the present frenching apparatus 10 provides an advantageous means of transporting the piece of meat 100, other means can be used to move the piece of meat 100 to practice the method of the present invention (not shown). Although it is preferred that the frenching apparatus 10 be operated continuously, if desired, the frenching apparatus 10 can be operated intermittently or at variable speed. For example, it may be desired to slow or stop the operation of the conveyer 30 while a piece of meat 100 is actually being cut or stripped by the jet means 80, 90, 92 and sped up otherwise.

After being processed by the cutting jet means 80 and the stripping jet means 90, 92, the piece of meat 100 is transported to the output end 14 of the frenching apparatus 10 and released from the drive chains 32, 34. Another conveyer means (not illustrated) could be provided proximate the output and 14 to transport the piece of meat 100 away from the frenching apparatus 10 for packaging, storage, or further processing.

Traditionally, frenching is done by hand, thus requiring the rack of lamb to be in a fresh or thawed state. The frenching apparatus 10 and the method of the present invention permit the frenching of a rack which is in a frozen state, a task that would normally be difficult if not impossible. The frenching apparatus 10 also reduces the labour required to french the ribs to a fraction of what it would be otherwise. The simple yet very effective design of the present frenching apparatus 10 provides an elegant solution to the problem of mass producing frenched racks of lamb.

From the foregoing description and accompanying drawings, it is seen that the present invention provides a novel frenching apparatus 10 for removing predetermined tissue from bone in a piece of meat 100, as well as a method for automated processing of a piece of meat 100 which can employ the frenching apparatus 10 for removing tissue from bone. The frenching apparatus 10 permits an operator to quickly and efficiently mass produce frenched racks of lamb or other meat. Further, the racks of lamb or other meat may be frenched in a frozen state, thus providing the packing house operator with valuable flexibility in scheduling meat packaging operations. The racks of lamb need not be frenched immediately prior to freezing or immediately after defrosting. Instead, frozen racks of lamb may be supplied from storage to the frenching apparatus 10 and returned after frenching to storage. Because of the additional scheduling flexibility provided by this capability of the frenching apparatus 10, the cost of frenching is further advantageously reduced.

It will be recognized by those skilled in the art that changes may be made to the above-described embodiment of the invention without departing from the broad invention concepts thereof. For example, other means can be provided for moving the piece of meat through a first and second position. Alternatively, the fluid jets may be co-located or may employ a fluid other than water, for example high pressure air. It is understood, therefore, that this invention is not limited to the particular embodiment disclosed, but is intended to cover all modifications which are within the scope and spirit of the invention as defined by the appended claims.

We claim:

1. Apparatus for automated removal of tissue from the distal end of the rib bones of a rack of lamb, comprising generally horizontally oriented transport means for conveying the rack of lamb generally horizontally including a meat input end and a meat output end, the conveyer means being adapted to operate continuously and including a pair of generally spaced drive means, each drive means including an endless drive chain including teeth for engaging the rack of lamb generally linearly through a first and second predetermined position, with the distal end of the rack extending below the conveyer means, fluid delivery means positioned between the meat input end and the meat output end for dispensing liquid at a predetermined pressure, the fluid delivery means including fluid cutting means located at the first position for cutting the tissue of the rack of lamb, the cutting means including a pair of cutting nozzles disposed on opposite sides of the ribs of the rack of lamb for directing a pair of generally co-linear and oppositely directed jets of liquid of a generally circular cross-section at the ribs when located proximate to the first position, the plane of the jets being generally horizontal and generally perpendicular to the path defined by the motion of rack in the apparatus and positioned below the transport means, and further including a first and a second stripping nozzle located at the second position for forming generally fan-shaped jets of liquid to impact upon opposite sides of approximately the same portion of each rib, the first stripping nozzle being adapted to direct a jet of liquid at an angle of about 38 degrees with respect to the path along which rack of lamb is transported at the ribs as the rack of lamb approaches the second position, the second stripping nozzle being adapted to direct a jet of water at an angle of about 48 degrees with respect to the path along which the rack of lamp is being transported at the ribs as the rack of lamb moves away from the second position.

2. Apparatus for automated removal of tissue from the distal end of the rib bones of a rack of lamb, comprising generally horizontally oriented transport means for conveying the rack of lamb generally horizontally including a meat input end and a meat output end, the conveyer means being adapted to operate continuously and including a pair of generally spaced drive means, each drive means including an endless drive chain including teeth for engaging the rack of lamb generally linearly through a first and a second predetermined position, with the distal end of the rack extending below the conveyor means and above deflector guards mounted generally parallel to the drive means and spaced apart therefrom to protect a portion of the rack from liquid dispensed at a predetermined pressure form fluid delivery means positioned between the meat input end and the meat output end, the fluid delivery means including fluid cutting means located at the first position for cutting the tissue of the rack of lamb, the cutting means including a pair of cutting nozzles disposed on opposite sides of the ribs of the rack of lamb for directing a pair of generally co-linear and oppositely directed jets of liquid of a generally circular cross-section at the ribs when located proximate to the first position, the plane of the jets being generally horizontal and generally perpendicular to the path defined by the motion of rack in the apparatus and positioned below the transport means, and further including a first and a second stripping nozzle located at the second position for forming generally fan-shaped jets of liquid to impact upon opposite sides of approximately the same portion of each rib, the first stripping nozzle being adapted to direct a jet of liquid at an angle of about 38 degrees with respect to the path along which rack of lamb is transported at the ribs as the rack of lamb approaches the second position, the second stripping nozzle being adapted to direct a jet of water at an angle of about 48 degrees with respect to the path along which the rack of lamb is being transported at the ribs as the rack of lamb moves away from the second position.

3. A method for automated removal of tissue from a distal end of the rib bones of a rack of lamb, the method comprising the steps of moving the rack of lamb generally horizontally through a cutting zone incorporating a first and a second predetermined position by a continuously operating generally horizontally oriented transport means comprising a pair of generally parallel spaced continuous drive chains having teeth for engaging the rack of lamb, the teeth of the drive chains being directed toward each other, the piece of meat being securely received between the drive chains and engaged by the teeth, generally linearly through the first and the second predetermined positions with the distal end of the ribs extending below the transport means, and during which first cutting at least a portion of the tissue extending below the transport means by a fluid jet cutting means comprising a pair of cutting nozzles disposed on opposing sides of the rack of lamb for directing a pair of generally co-linear and oppositely directed jets of fluid of a generally circular cross-section at the distal end of the ribs extending below the transport means, the plane of the jets being generally horizontal and generally perpendicular to the path defines by the motion of the rack engaged within the transport means, and second stripping at least a portion of the previously cut tissue extending below the transport means from the rib by fluid jet stripping means comprising a first and a second nozzle for forming generally fan shaped jets of liquid to impact on opposite sides of approximately the same portion of each rib at angles of about 38 degrees and about 48 degrees respectively, with respect to the path defined by the motion of the rack engaged within the transportation means.

4. A method for automated removal of tissue from a distal end of the rib bones of a rack of lamb, the method comprising the steps of moving the rack of lamb generally horizontally through a cutting zone incorporating a first and a second predetermined position by a continuously operating generally horizontally oriented transport means comprising a pair of generally parallel spaced continuous drive chains having teeth for engaging the rack of lamb, the teeth of the drive chains being directed toward each other, the piece of meat being securely received between the drive chains and engaged by the teeth, generally linearly through the first and the second predetermined positions with the distal end of the ribs extending below the transport means and below deflector guards mounted generally parallel thereto, but spaced apart therefrom so as to protect a portion of the rack from liquid dispensed by fluid jet cutting means, and during which first cutting at least a portion of the tissue extending below the transport means and the deflector guards by the fluid jet cutting means, said means comprising a pair of cutting nozzles disposed on opposing sides of the rack of lamb for directing a pair of generally co-linear and oppositely directed jets of fluid of a generally circular cross-section at the distal end of the ribs extending below the transport means, the plane of the jets being generally horizontal and generally perpendicular to the path defined by the motion of the rack engaged within the transport means, and second stripping at least a portion of the previously cut tissue extending below the transport means from the rib by fluid jet stripping means comprising a first and a second nozzle for forming generally fan shaped jets of liquid to impact on opposite sides of approximately the same portion of each rib at angles of about 38 degrees and about 48 degrees respectively, with respect to the path defined by the motion of the rack engaged within the transportation means.

5. A method for automated removal of frozen tissue from a distal end of the rib bones of a frozen rack of lamb, the method comprising the steps of moving the frozen rack of lamb generally horizontally through a cutting zone incorporating a first and a second predetermined position by a continuously operating generally horizontally oriented transport means comprising a pair of generally parallel spaced continuous drive chains having teeth for engaging the frozen rack of lamb, the teeth of the drive chains being directed toward each other, the piece of meat being securely received between the drive chains and engaged by the teeth, generally linearly through the first and the second predetermined positions with the distal end of the ribs extending below the transport means, and during which first cutting at least a portion of the frozen tissue extending below the transport means by fluid jet cutting means comprising a pair of cutting nozzles disposed on opposing sides of the frozen rack of lamb for directing a pair of generally co-linear and oppositely directed jets of fluid of a generally circular cross-section at the distal end of the ribs extending below the transport means, the plane of the jets being generally horizontal and generally perpendicular to the path defined by the motion of the frozen rack engaged within the transport means, and second stripping at least a portion of the previously cut frozen tissue extending below the transport means from the rib by fluid jet stripping means comprising a first and a second nozzle for forming generally fan shaped jets of liquid to impact on opposite sides of approximately the same portion of each rib at angles of about 38 degrees and about 48 degrees respectively, with respect to the path defined by the motion of the frozen rack engaged within the transportation means.

6. A method for automated removal of frozen tissue from a distal end of the rib bones of a frozen rack of lamb, the method comprising the steps of moving the frozen rack of lamb generally horizontally through a cutting zone incorporating a first and a second predetermined position by a continuously operating generally horizontally oriented transport means comprising a pair of generally parallel spaced continuous drive chains having teeth for engaging the frozen rack of lamb, the teeth of the drive chains being directed toward each other, the piece of meat being securely received between the drive chains and engaged by the teeth, generally linearly through the first and the second predetermined positions with the distal end of the ribs extending below the transport means and below deflector guards mounted generally parallel thereto, but spaced apart therefrom so as to protect a portion of the frozen rack from liquid dispensed by fluid jet cutting means, and during which first cutting at least a portion of the frozen tissue extending below the transport means and the deflector guards by the fluid jet cutting means, said means comprising a pair of cutting nozzles disposed on opposing sides of the frozen rack of lamb for directing a pair of generally co-linear and oppositely directed jets of fluid of a generally circular cross-section at the distal end of the ribs extending below the transport means, the plane of the jets being generally horizontal and generally perpendicular to the path defined by the motion of the frozen rack engaged within the transport means, and second stripping at least a portion of the previously cut frozen tissue extending below the transport means from the rib by fluid jet stripping means comprising a first and a second nozzle for forming generally fan shaped jets of liquid to impact on opposite sides of approximately the same portion of each rib at angles of about 38 degrees and about 48 degrees respectively, with respect to the path defined by the motion of the frozen rack engaged within the transportation means.

* * * * *